Jan. 21, 1969     O. F. VATTEROTT     3,422,595
BALLING AND BAGGING MACHINE FOR NURSERY STOCK AND THE LIKE
Filed July 29, 1965                                Sheet _1_ of 2
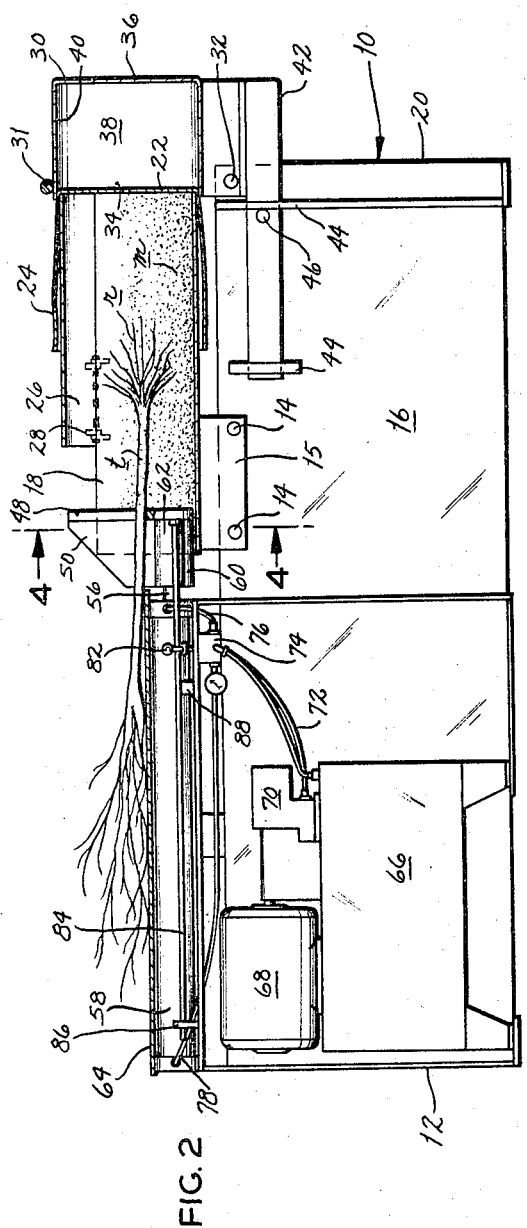
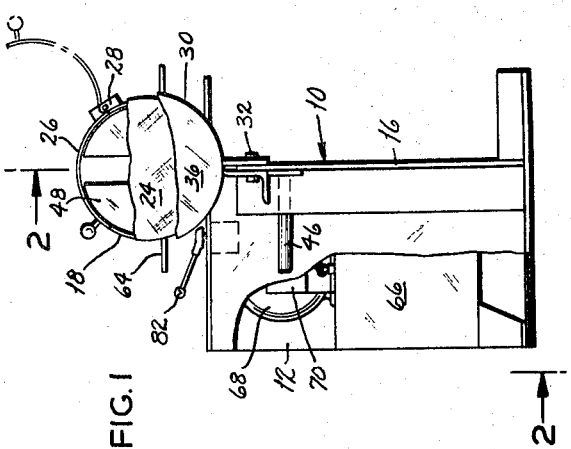
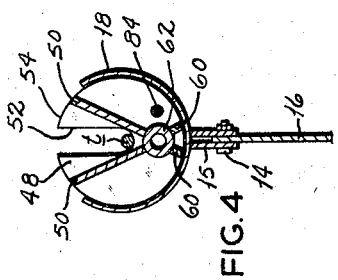
INVENTOR
OSKAR F. VATTEROTT
BY
*Jerome A. Gross*
ATTORNEY Jan. 21, 1969     O. F. VATTEROTT     3,422,595
BALLING AND BAGGING MACHINE FOR NURSERY STOCK AND THE LIKE
Filed July 29, 1965

INVENTOR
OSKAR F. VATTEROTT
BY
    ATTORNEY

United States Patent Office 3,422,595
Patented Jan. 21, 1969

3,422,595
BALLING AND BAGGING MACHINE FOR NURSERY STOCK AND THE LIKE
Oskar F. Vatterott, Sappington, Mo., assignor to Southwestern Nursery Supply Company, St. Louis, Mo., a corporation of Missouri
Filed July 29, 1965, Ser. No. 475,640
U.S. Cl. 53—124  3 Claims
Int. Cl. B65b 63/02, 13/02, 5/00

ABSTRACT OF THE DISCLOSURE

A machine for compacting balling material around the roots of trees and the like, and bagging the roots and compacted material, includes a split trough which opens for filling and closes to provide a cylindrical end over which a bag is drawn. A hollow cylindrical compacting bucket latches in a compacting position adjacent to and surrounding the bag end. A cleft piston drives the roots and balling material into the compacting chamber. On withdrawing the cylinder, the compacting chamber is pivoted aft and lowered to upright position, for removing the balled and bagged tree.

---

The present invention relates generally to a machine for compacting resilient balling material around the roots of young trees, and bagging the resultant mass. More particularly, it pertains to such a machine wherein the compaction is carried out in a chamber separate from the receptacle in which the roots and balling material are preliminarily received.

Heretofore, some machines have been made for packing earth or balling material about the roots of trees, shrubs, and the like; in these the compaction takes place in the same single receptacle or container in which the loose earth and tree roots are first placed. Such machines presented many problems; one important problem being how bags could be preliminarily arranged so that compaction of the material could take place within the bag. This problem has heretofore appeared insurmountable. The present accepted practices appear to be either a simple tamping operation into a bag, or a machine-compacting operation where the compacted ball must be removed from the machine before bagging. S. E. Clegg, in his Patent 2,698,500 (in contrast to his earlier Patent 2,669,085), uses cylindrical sheaths which must be tied both above and below. Even here the compacted mass tended to break up before the ball could be tied. Furthermore, it was not possible after the compaction operation for the bagging operation to be completed while the machine was simultaneously being readied for a subsequent compaction operation.

Therefore, among the objects of the present invention is the provision of a machine for compacting resilient balling matrial, such as peat moss, around the roots of a tree and bagging same, wherein the tree roots and resilient balling material are initially received in a receptacle and the compaction takes place in an entirely separate compaction chamber. Another important purpose is to provide means for feeding a bag into the separate compaction chamber, so that it will not bunch up preliminary to the compaction operation. Another object is to provide such a separate compaction chamber of larger diameter, wherein the tree roots are free to expand radially outward to avoid bunching. Another object is to permit the tree to be supported substantially horizontally during compaction of the material within the bag and then swung through an angle of substantially 90° to a vertical position to which it may be unloaded in an upright position from the machine.

These objects (as well as other features of operation apparent herefrom) are achieved generally by providing a machine including a substantially cylindrical covered trough which is opened to receive the base and roots of the tree, and which when closed presents a sleeve-like end over which a bag may be drawn and preliminarily held, so that the bag bottom is presented across the end of the trough. The trough has an interior for initially receiving the tree roots and loose balling material. A piston having a tree-trunk accommodating aperture and means to power the piston are located adjacent to the end of the trough opposite its bag-holding end. The piston is characterized by a travel from a trough-filling position, adjacent the one end of the trough, across its entire length of a compacting position at the other end. A compaction chamber is hinged by means of a pivot pin adjacent to the bag-holding end of the trough and in axial alignment therewith so that its open end communicates with the trough. The piston, traveling across the entire length of the trough, drives the trough contents before it, and they draw the bag into the larger diameter compaction chamber at the trough end. A latching member is provided at the bag-holding end of the trough to hold the compaction chamber in its compacting position. Upon unlatching, the chamber is free to pivot aft and down through 90° to an unloading position. The bag is then tied and the balled tree removed from the machine in an erect position.

Utilization of the invention will become apparent to those skilled in the art from the disclosures made in the following description of the preferred embodiment of the invention, as illustrated in the accompanying drawings, in which:

FIG. 1 is an end view, broken away in parts, showing the balling and bagging machine of the present invention, the phantom lines indicating the raised position of the cover for a receiving trough;

FIG. 2 is a side view of the machine of FIG. 1 prior to the compaction operation, except that the right half of FIG. 2 is broken away as seen along line 2—2 of FIG. 1 to reveal interior details;

FIG. 4 is a cross-sectional view of the compaction piston mechanism taken along line 4—4 of FIG. 2.

Figure 3:
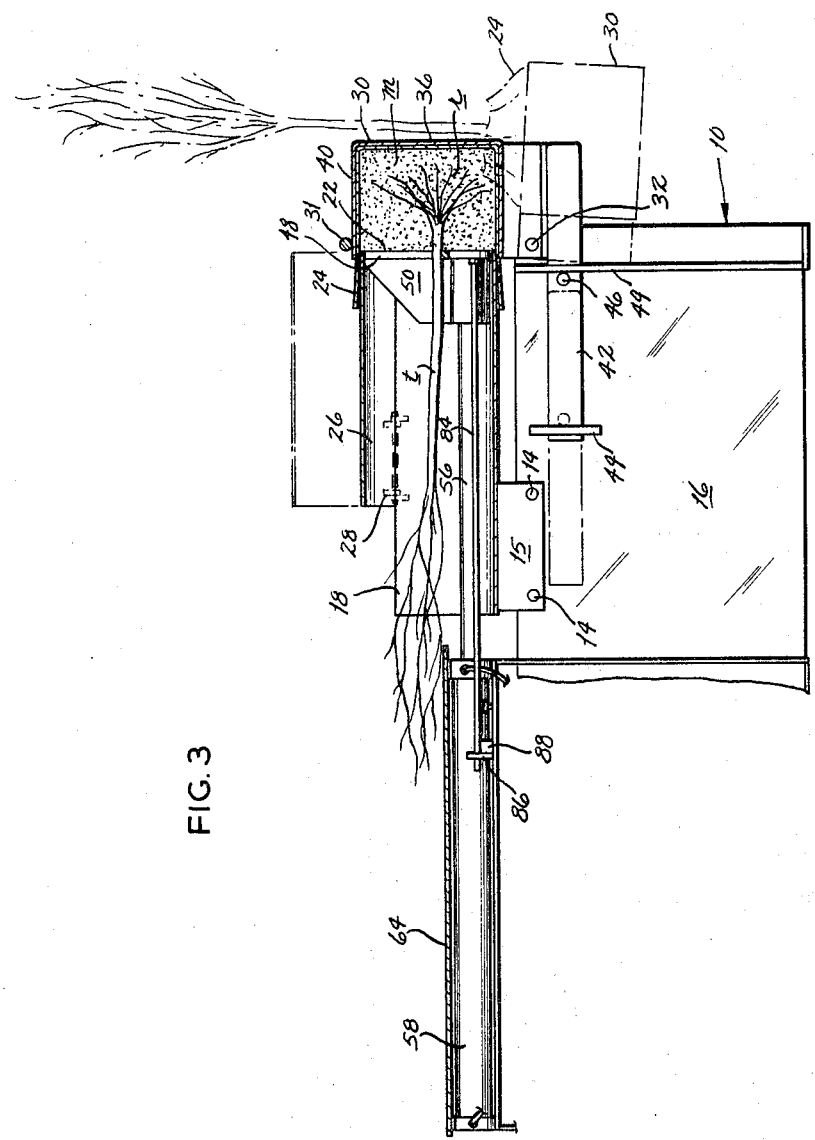
FIG. 3 is a view similar to FIG. 2 showing the positions of the parts after the compaction operation has taken place, the phantom lines indicating the unloading position of the machine bucket and tree.

Referring now to the drawings wherein like reference characters designate like or corresponding parts throughout the several views, there is shown in FIG. 2 a machine, generally designated 10, for compacting resilient balling material, such as peat moss, around the roots of a tree and in which bagging of the resultant mass is simultaneously performed.

TROUGH MEANS

The balling and bagging machine 10 includes a frame member, generally designated 12, which consists of welded-together plates, angles, and the like. Two retractable pins 14 secure a U-shaped bracket 15 over the upper edge of a vertically disposed frame plate 16. Welded to the U-shaped bracket 15 is a substantially cylindrical open-ended trough 18 which extends horizontally from near the longitudinal center of the frame 12 to the unloading end 20 of the machine 10. The bracket 15 positions the trough 18 above the upper edge of the frame plate 16 so that there is sufficient clearance at its bag-holding end 22 to permit a burlap bag 24 or the like (especially one sewn so that, when filled, its wall will assume a cylindrical shape) to be fitted over it. In this manner the bag-holding end 22 of the trough 18 serves as a sleeve for guiding the bag 24 and its contents as they are subsequently driven endwise into the compaction chamber, to be described hereinafter. The interior of the receiving trough 18 is sufficiently large to readily receive loose balling material *m* which is to be compacted into a firm ball around the roots *r* of a tree, whose trunk is designated *t*. Access to the interior of the open-ended trough 18 is had by means of an accurate cover 26 hinged to the trough 18 as at 28 so as to complete a cylindrical sleeve. The cover 26 is pivotable from its closed position (see in FIG. 1) to its open position (see the phantom lines of FIGS. 1 and 3).

COMPACTION CHAMBER MEANS

A hollow, cylindrical bucket 30 is mounted to the frame member 12 at its unloading end 20 by means of a pivot pin 32. The bucket 30 is positioned with its open end 34 adjacent to the bag-holding end 22 and in axial alignment with the receiving trough 18. So positioned the flat bottom 36 of the bucket 30 is remote from the bag-holding end 22 of the trough 18 and perpendicular to the axis of the trough 18. In its raised compacting position the cylindrical bucket 30 provides a compaction chamber 38 which is defined by its inner wall 40. In the preferred embodiment illustrated, the diameter of the inner wall 40 is greater than the outside diameter of the bag-holding end 22 of the cylindrical trough 18. Thus, the open end 34 of the bucket 30 surrounds the bag-holding end 22 of the trough, with sufficient clearance provided to allow the burlap bag 24 to be placed over the sleeve-like end 22 of the trough 18, its bottom received within the open end 34 of the bucket 30. Preferably the diameter of the compaction chamber 38 is somewhat greater than its depth. To assure stability of the formed ball when set upright after bagging, this proportionality is desirable.

LATCH MECHANISM

A latch member 42 is slidingly secured to the frame 12 below the compaction chamber bucket 30 by means of two slotted brackets 44 which are welded to the frame plate 16. The latch member 42 includes a handle 46 which is used to slide it through slots in the brackets 44 so that the latch member may be moved between the positions indicated by the solid and dashed lines of FIG. 3. In the position indicated by the solid lines the latch member 42 extends outward beyond the frame end 20 to hold the compaction chamber bucket 30 raised in its compaction position. However, when the latch member 42 is slidingly removed to the position indicated by the dashed lines, the compaction chamber bucket 30 may be lowered by means of its handle 31 to the position indicated by the dashed lines of FIG. 3. Thus, upon unlatching the bucket 30, it may be pivotably swung through an angle of approximately 90° aft and down from its raised, compaction position to its lowered, unloading position.

PISTON MEANS

At the end of the receiving trough 18 opposite its bag-holding end 22 there is provided a horizotnally-movable compacting piston 48 including reinforcing plates 50 and a tree-trunk accommodating aperture or slot 52. In the present embodiment the tree-trunk accommodating aperture 52 takes the form of a cleft which extends downwards from the upper arcuate peripheral surface 54 to terminate below the center of the piston 48. This arrangement permits the tree trunk *t* to be supported substantially horizontally at the axis of the receiving trough 18 with its limbs and branches resting on a support pad, to be described hereinafter.

The compacting piston 48 is threadingly engaged below its center by a piston rod 56 which extends from a double-acting hydraulic cylinder 58. Operation of the hydraulic cylinder 58 causes the compacting piston 48 to travel from its trough-filling position (see FIG. 2) across the length of the receiving trough 18 to a compacting position at its bag-holding end 22 (FIG. 3). To guide the compacting piston 18 in its movement from the trough-filling position to the compacting position, and to resist wear, bearing support rails or runners 60 are welded to a piston rod sleeve 62 which engages the piston rod 56. These bearing support rails 60 extend aft from the lower arcuate peripheral surface of the piston 48 and engage the inner surface of the trough 18 at its bottom, and firmly support the piston 48 even though in extreme extended position its face may project slightly beyond the end of the trough 18.

TREE SUPPORT TABLE

Behind the compacting piston 48 and above the hydraulic cylinder 58 there is provided a tree-support table member or support pad 64. Preferably the pad 64 is coated with polyethylene material so that it will support the tree limbs and branches and prevent damage to them as they are drawn across it.

HYDRAULIC POWER AND TRAVEL LIMIT MECHANISM

Beneath the support pad 64 and hydraulic cylinder 58 and within the frame member 12, there is provided a hydraulic fluid tank 66, here being rectangular, upon which is mounted an electric motor 68 and a hydraulic fluid pump 70. Preferably the hydraulic fluid pump 70 is of the "walking-ring," variable volume type. It is driven by the electric motor 68 and delivers hydraulic fluid under pressure to a feed line 72 which is connected to a conventional hydraulic valve 74. The hydraulic valve 74 connects to the cylinder 58 by means of feed lines 76 and 78 which connect to fittings at the ends of the hydraulic cylinder 58. A return line is also provided between the hydraulic valve 74 and the hydraulic fluid tank 66. A handle 82 at the hydraulic valve 74 permits the operator of the machine 10 to direct hydraulic fluid to either end of the double-acting hydraulic cylinder and thus effect the reciprocable movement of the piston 48 from its trough-filling position to its compaction position. The walking-ring, vane-type pump is preferred; if the resistance to the advancement of the piston 48 exceeds a predetermined value during the compaction cycle, the pump will automatically adjust itself so that the supply of hydraulic fluid to the hydraulic cylinder 58 will cease. In this manner, automatic pressure relief is included in the hydraulic system, and it is assured that a predetermined degree of compaction will not be exceeded. That is, once the resistance of compaction has reached a selected level, the piston will be inhibited from further advancement along its path of travel because the pump 48 will no longer deliver hydraulic fluid to the power cylinder 58.

Where it is desirable to limit the advancement of the piston along its path of travel to a specified distance regardless of the resistance encountered by it, I provide limit stop means. A limit stop rod 84 is threadingly secured to the aft face of the piston 48 and extends longitudinally at the side of the hydraulic cylinder 58 to the end of the frame member 12. The limit stop rod 84 is threaded throughout a large portion of its length so that a stop tab 86, which includes a threaded bore, may be turned on to it. Thus, the stop tab 86 may be set at various selected positions along the rod 84. An abutment block 88 is welded to the frame member 12 near the hydraulic valve 74 and in longitudinal alignment with the travel of the stop tab 86 as it follows the movement of the piston 48 and the attached limit stop rod 84. The piston will move toward its compaction position until the stop tab 86 engages the abutment block 88. Upon such engagement, the movement of the piston 48 is restrained by rod 84. The resulting resistance to the piston movement causes the fluid pump 70 to cease the supply of fluid to the cylinder 58.

OPERATION

Initially with the bucket 30 at its lowered position and the receiving trough cover 26 raised to its open position, a small tree is placed onto the machine with its stem or trunk *t* received within the treetrunk accommodating aperture 52 of the piston 48. With the piston 58 in its trough-filling position, as shown in FIG. 2, the roots *r* of the tree will be positioned within the interior of the receiving trough 18, and its branches will be supported upon the support pad 64. Balling material *m*, such as peat moss, earth, or the like, is inserted within the receiving trough 18 (see FIG. 2) and the cover 26 is returned to its closed position. Next a burlap bag 24 is drawn over the bag-accommodating end 22 of the trough 18 and smoothed out over its outer surface. Then the bucket 30 is slung to its raised compaction position and held there surrounding the bag bottom by the latch member 42.

Actuation of the electric motor 68 energizes the hydraulic pump 70 and delivers hydraulic fluid from the tank 66 through the valve 74 to the left-hand end of the cylinder 58. The application of the hydraulic fluid to this end of the cylinder 58 causes the piston to travel across the length of the receiving trough 18 carrying with it the balling material and the supported tree. At the end of this travel, the piston 48 has forced the balling material *m*, the roots *r*, and the bag 24 into the compaction chamber 38 where the roots *r* move somewhat outwardly (because of its larger inner diameter) as the balling material *m* is compacted about them (see FIG. 3).

After the compaction operation is completed, the piston 46 is returned to its initial position by reversing the hydraulic valve 74 so that hydraulic fluid is supplied to the other end of the cylinder 58. Then the cover 26 is opened. Then the latch member 42 is withdrawn and the bucket 30 lowered until the balled tree is rotated to and supported in its erect, vertical position. In this erect position the bag 24 is then tied around the compacted ball at the base of the tree. Simultaneous with the tying operation a second tree is readied for the compaction operation in the receiving trough 18. After the tying operation has been completed, the tree and its compacted mass may be removed from the machine without fear of the compacted ball becoming fractured or breaking up.

Many modifications and variations are possible in view of the above teachings, therefore it is to be understood that, within the scope of the appended claims the invention may be practiced otherwise than as specifically described.

I claim:

1. A machine for compacting balling material such as peat moss around the roots of a tree and bagging same, comprising:
   substantially cylindrical trough means having an end over which a bag may be drawn and preliminary held, and having an interior for receiving such tree roots and loose balling material,
   piston means, having a tree-trunk accommodating aperture,
   piston powering means adjacent the end of said cylindrical trough means opposite its bag-holding end,
   said piston means being characterized by a travel from a trough-filling position, adjacent said powering means end of said cylindrical trough means, across the length thereof to a compacting position at its bag-holding end,
   in combination with
   a compaction chamber having an open end, and
   means to position said compaction chamber in a compacting position with its open end immediately adjacent to and axially continuous with said bag-holding end and in axial alignment with said cylindrical trough means and to permit said chamber to be moved from said compacting position to an unloading position remote therefrom,
   said means to position said compaction chamber including:
   a pivot pin definingg a pivot-axis below and adjacent to said bag-holding end of said cylindrical trough means, and
   latch means to hold said compaction chamber in its compacting position,
   whereby upon unlatching said latch means said compacting chamber may be pivotally swung aft and down from its compacting position to its said unloading position through an angle of substantially 90°, thereby moving the balled tree to erect position, 2. A machine for compacting balling material such as peat moss around the roots of a tree and bagging same, comprising:
   substantially cylindrical trough means having an end over which a bag may be drawn and preliminarily held, and having an interior for receiving such tree roots and loose balling material,
   piston means, having a tree-trunk accommodating aperture,
   piston powering means adjacent the end of said cylindrical trough means opposite its bag-holding end,
   said piston means being characterizezd by a travel from a trough-filling position, adjacent said powering means end of said cylindrical trough means, across the length thereof to a compacting position at its bag-holding end,
   in combination with
   a compaction chamber having an open end, and
   means to position said compaction chamber in a compacting position with its open end immediately adjacent to and axially continuous with said bag-holding end and in axial alignment with said cylindrical trough means and to permit said chamber to be moved from said compacting position to an unloading position remote therefrom, wherein
   said compaction chamber is a hollow cylinder having a bottom remote from its said open end and having a wall characterized by an inside diameter greater than the outside diameter of said cylindrical trough means and whose open end, when in said compacting position, surrounds the bag-holding end of said trough means.
   whereby to allow such a bag so preliminarily held over the end of the trough means to be drawn endwise therefrom into the compaction chamber and adjacent to the inner surface of its wall.

3. A machine for compacting balling material such as peat moss around the roots of a tree and bagging same, comprising:
   substantially cylindrical trough means having an end over which a bag may be drawn and preliminarily held, and having an interior for receiving such tree roots and loose balling material,
   piston means, having a tree-trunk accommodating aperture,
   piston powering means adjacent the end of said cylindrical trough means opposite its bag-holding end,
   said piston means being characterized by a travel from a trough-filling position, adjacent said powering means end of said cylindrical trough means, across the length thereof to a compacting position at its bag-holding end,
   in combination with
   a compaction chamber having an open end, and
   means to position said compaction chamber in a compacting position with its open end immediately adjacent to and axially continuous with said bag-holding end and in axial alignment with said cylindrical trough means and to permit said chamber to be moved from said compacting position to an unloading position remote therefrom, wherein
   the cylindrical trough means is split and hinged adjacent to its bag-holding end,
   whereby to have a hinged open position for filling and a closed cylindrical position for compacting, and wherein the compaction chamber is a hollow cylinder having an open end which, in its said compacting position, surrounds the split bag-holding end of the trough means when same is in its closed position.

References Cited

UNITED STATES PATENTS

| | | | |
|---|---|---|---|
| 2,847,808 | 8/1958 | Romine | 53—124 |
| 3,001,345 | 9/1961 | Zeller | 53—124 |
| 3,135,075 | 6/1964 | Havelka et al. | 53—124 X |
| 3,143,836 | 8/1964 | Weller | 53—124 |
| 3,284,981 | 11/1966 | Broersma | 53—124 |

TRAVIS S. McGEHEE, *Primary Examiner.*

ROBERT L. FARRIS, *Assistant Examiner.*

U.S. Cl. X.R.

53—239